United States Patent [19]

Garneau

[11] Patent Number: 4,527,594

[45] Date of Patent: Jul. 9, 1985

[54] CHECK VALVE

[75] Inventor: Richard P. Garneau, Davie, Fla.

[73] Assignee: The AFA Corporation, Hialeah, Fla.

[21] Appl. No.: 597,838

[22] Filed: Apr. 9, 1984

Related U.S. Application Data

[63] Continuation-in-part of Ser. No. 503,907, Jun. 13, 1983.

[51] Int. Cl.[3] ............ F16K 15/14

[52] U.S. Cl. ............ 137/854

[58] Field of Search ............ 137/843, 853, 854

[56] References Cited

U.S. PATENT DOCUMENTS

| | | | |
|---|---|---|---|
| 2,008,818 | 7/1935 | Corbett | 137/854 X |
| 2,270,333 | 1/1942 | Osborn | 137/854 |
| 2,912,999 | 11/1959 | Kersh | 137/512.4 |
| 2,913,000 | 11/1959 | Roberts | 137/525 |
| 2,949,929 | 8/1960 | Moore | 137/843 X |
| 3,250,219 | 5/1966 | McCarty | 137/854 X |
| 3,331,390 | 7/1967 | Hoffman | 137/854 |
| 3,473,561 | 10/1969 | Svenson | 137/854 |
| 3,476,142 | 11/1969 | Schultz | 137/854 X |
| 3,626,978 | 12/1971 | Hoekstra | 137/854 |
| 4,307,731 | 12/1981 | Kaufman | 137/854 X |

*Primary Examiner*—Robert G. Nilson
*Attorney, Agent, or Firm*—Thomas R. Vigil

[57] ABSTRACT

The check valve is used to control the flow of fluid through a cylindrical passageway having a cylindrical wall surface and comprises an elongate umbrella valve member having a frusto-conical shaped skirt extending radially outwardly and axially of the valve member. The skirt is positioned to extend in the downstream direction of the flow of fluid through the passageway and in frictional, sealing engagement with the cylindrical wall surface of the passageway but yet being flexible enough to deflect inwardly under fluid pressure to allow fluid to flow downstream past the skirt.

10 Claims, 7 Drawing Figures

CHECK VALVE

CROSS REFERENCE TO RELATED APPLICATION

This application is a continuation-in-part of U.S. application Ser. No. 503,907 filed on June 13, 1983 for TRIGGER SPRAYER.

BACKGROUND OF THE INVENTION

1. Field of the invention

The present invention relates to a check valve which can be used generally in any fluid line and more specifically in a trigger sprayer of the type which is mounted to the top of a container of liquid and which has a trigger handle which can be squeezed to cause pumping and dispensing of liquid from a nozzle of the sprayer.

More specifically the invention relates to a conical skirt/umbrella valve member of the check valve.

2. Description of the prior art

Heretofore various flap type valves have been proposed for use in trigger sprayers. Examples of such flap type valves are disclosed in the Miller U.S. Pat. No. 3,130,871, the Humphrey U.S. Pat. No. 3,486,663, the Davidson et al U.S. Pat. No. 3,726,442, the Micallef U.S. Pat. No. 3,749,290, the Schmidt et al U.S. Pat. No. 3,973,700, the Grogan U.S. Pat. No. 3,986,644, the Cooprider et al U.S. Pat. No. 3,987,938, the Cooprider et al U.S. Pat. No. 3,995,774, the Alef U.S. Pat. No. 4,201,317 and the Blake et al U.S. Pat. No. 4,225,061.

Also, an O-ring type valve is disclosed in U.S. Pat. No. 3,768,734.

As will be described in greater detail hereinafter, the check valve of the present invention differs from the previously proposed flap type valves and O-ring type valves by providing a simple, inexpensive plastic valve element which has a frusto-conical skirt or umbrella-like configuration that frictionally and sealingly engages with a cylindrical wall of a bore in a body of a valve housing or trigger sprayer and which is deflectable radially inwardly by fluid pressure so as to allow the pressurized fluid to pass around the skirt or umbrella-like configuration and downstream of the check valve.

SUMMARY OF THE INVENTION

According to the invention there is provided a check valve for controlling the flow of fluid through a cylindrical passageway having a cylindrical wall surface, said check valve comprising: a housing with a stepped chamber therein, a larger diameter portion of said chamber forming said cylindrical passageway and an annular shoulder being defined at the junction between the larger chamber portion and a smaller-in-cross-section portion; an elongate umbrella valve member having a frusto-conical shaped skirt extending radially outwardly and axially of said valve member, said skirt being positioned to extend in the downstream direction of the flow of fluid through the passageway and in frictional, sealing engagement with the cylindrical wall surface of the passageway but yet being flexible enough to deflect inwardly under fluid pressure to allow fluid to flow past said skirt; and said valve member further including a formation defined by at least two ribs extending radial outwardly and generally opposite of each other, and axially of said valve member and integral therewith, which formation is received in said passageway for seating on said annular shoulder and which has an upstream portion that extends into the smaller-in-cross-section chamber portion.

DESCRIPTION OF THE PREFERRED EMBODIMENT

Figure 1:
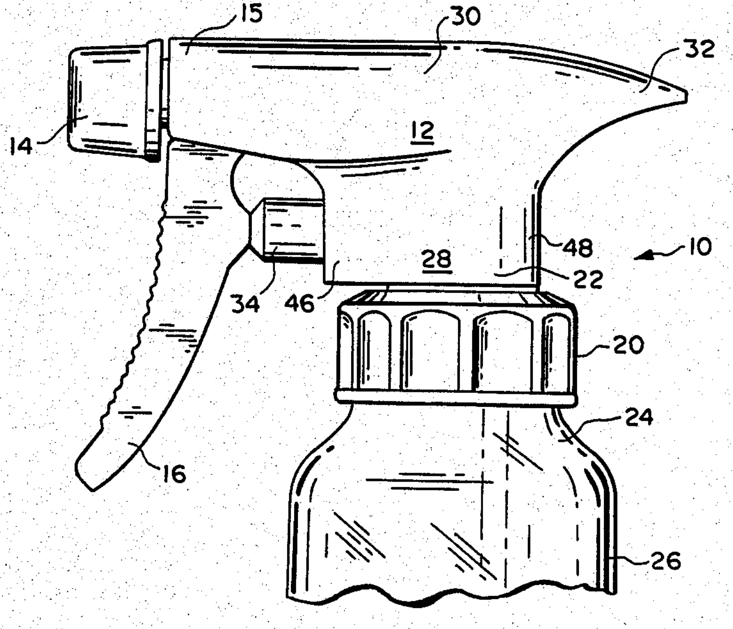
FIG. 1 is a side elevational view of a trigger sprayer.

Referring now to FIG. 1 in greater detail, there is illustrated therein, a trigger sprayer generally identified by the reference numeral 10. The sprayer 10 includes a body 12, a nozzle assembly 14 coupled to an outlet end 15 of body 12, a trigger handle 16 pivotally mounted internally of body 12, and a cap 20 coupled to an inlet end 22 of the body 12 and adapted to be connected to a neck 24 of a container or bottle 26.

As shown, the body 12 has a generally T-shape with a wide downwardly extending lower body portion 28 extending to the inlet end 22 connected to cap 20, and a horizontally extending upper body portion 30 having the outlet end 15 at one end thereof and a fairing or shroud 32 at the other end thereof. The shape of body 12 can, of course, have any desired shape and is not limited to a T-shape.

A piston or plunger 34 extends from the lower body portion 28 as shown in FIG. 1 and has a rounded yolk 36 (Fig. 2) in engagement with a seat formation 38 formed on back side 40 of the trigger handle 16. An inner portion 42 (FIG. 2) of the piston 34 is received in a sleeve 43 received in a cylindrical cavity 44 (FIG. 2) extending from a front side 46 of the lower body portion 28 generally horizontally into the lower body portion 28. A back side 48 of lower body portion 28 is rounded and forms with the trigger handle 16, a gripping formation by which a user of the trigger sprayer 10 can grip the sprayer 10 with one hand and squeeze to cause the trigger handle 16 to push the piston 34 into the sleeve 43 and cavity 44 against the force of a biasing spring 50 (FIG. 2) in the sleeve 43 and cavity 44. Although the piston 34 is actually received in the sleeve 43 that is press fitted into the cavity 44, reference will be made to the piston 34 being received in the cavity 44 only.

As will be described in greater detail hereinafter, squeezing of the trigger handle 16 will cause liquid to be expressed in a spray from the nozzle assembly 14 and on release of the handle 16, the spring 50, acting against the piston 34 and urging it outwardly, causes liquid to be drawn into the cavity 44 in the lower body portion 28.

Figure 2:
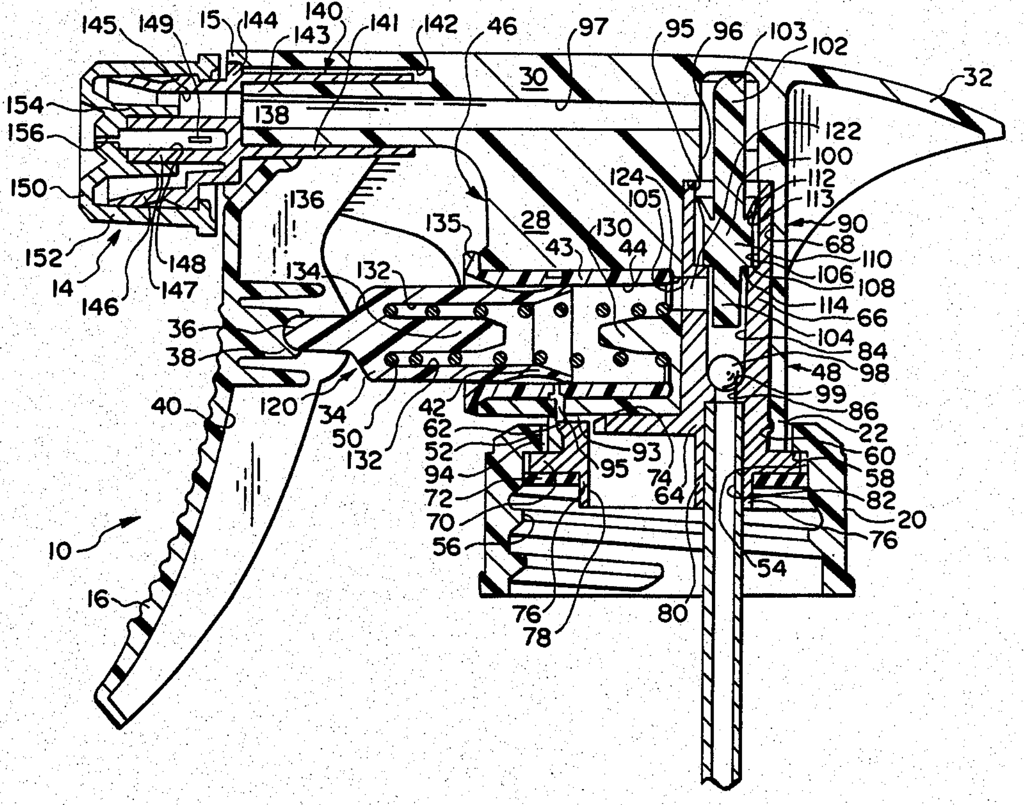
FIG. 2 is a vertical sectional view of the trigger sprayer shown in FIG. 1 and shows a valving system employing a ball valve and a conical skirt/umbrella valve member.

Referring now to FIG. 2, the inlet end 22 at the bottom of lower body portion 28 has a generally cylindrical, depending rim or flange 52 which extends into a cylindrical opening 54 in cap 20. The opening 54 extends to and communicates with a larger-in-diameter threaded cylindrical wall surface 56 where a shoulder 58 is formed between opening 54 and the cylindrical cavity defined by wall surface 56. Wall surface 56 is threadedly received on the threaded neck 24 of container 26.

The inside wall of the depending rim 52 has an annular groove 60 in which is snap-fittingly received an annular detent 62 on an insert member 64.

The insert member 64 is specially configured, as will be described further below, and is press-fitted into the cylindrical hollow within the depending rim 52 and has an upstanding cylindrical boss 66 which is received in a generally, vertically disposed, cylindrical cavity 68 extending upwardly from the bottom or inlet end 22 of lower body portion 28 into lower body portion 28.

The insert member 64 is generally cylindrical with an outer, radially extending, mounting flange 70 which seats adjacent shoulder 58 and can be held thereagainst by an elastomeric gasket 72 press-fitted into the cap 20 against flange 70 as shown.

The cylindrical boss 66 is eccentric to the central axis of the insert member 64 and extends upwardly from an upper surface 74 thereof which abuts the bottom or inlet end 22 of lower body portion 28.

Extending downwardly from flange 70 is a cylindrical formation 76 having a cavity 78 therein and a mound portion 80 which is in line with cylindrical boss 66 and eccentric of the center of cylindrical formation 76. A first bore 82 is formed in the mound portion 80 and extends upwardly into the insert member 64. A second bore 84 extends downwardly into the cylindrical boss 66 opposite first bore 82 and in general alignment, preferably coaxial therewith. A third smaller-in-diameter bore 86 extends between and communicates with the first and second bore 82 and 84 within the insert member 64.

Press-fitted within the first bore 82 is a dip tube 88 which extends downwardly into the container 26.

As will be described in detail hereinafter, the second bore 84 comprises part of a one-way check valve assembly 90.

For venting the container 26, a vent passage 92 extends between cavity 78 and upper surface 74 of insert member 64. A relief area 93 is formed in the upper surface 74 and communicates through a vent port 94 in lower body portion 28 and a vent port 95 in sleeve 43 to a forward portion of cavity 44 within the sleeve 43. This communication is normally covered by piston 34 but is open to the ambient environment for allowing air into the container 26 as liquid is dispersed therefrom when the piston 34 is moved into the cavity 44. A similar vent structure is disclosed in the Steyns U.S. Pat. No. 4,072,252 which is assigned to the assignee of this patent application, AFA Corporation of Hialeah, Fla.

The cylindrical boss 66 extends in a cavity 68 to a shoulder 95 and a smaller-in-diameter cavity extension 96 of cylindrical cavity 68 which extension 96 extends upwardly in body 12 into upper body portion 30. Here, in upper body portion 31, a horizontally extending passageway 97 communications the cavity extension 96 with the nozzle assembly 14.

Figure 4:
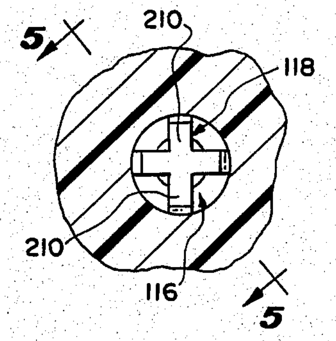
FIG. 4 is a fragmentary sectional view and is taken along line 4—4 of FIG. 3.
Figure 5:
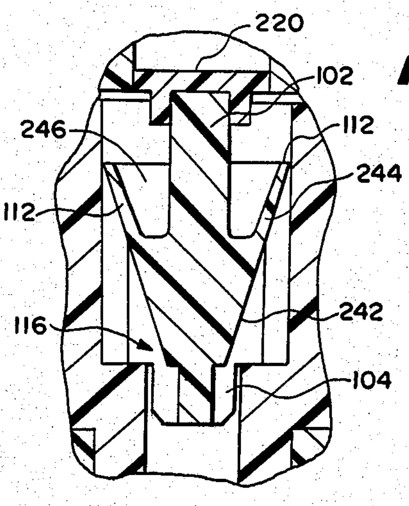
FIG. 5 is a fragmentary sectional view of the conical skirt/umbrella valve member and is taken along line 5—5 of FIG. 4.

The check valve assembly 90 includes a lower ball 98 seated on a conical valve seat 99 at the lower end of second bore 84 in the cylindrical boss 66. A specially configured elongate valve member 100 which has an inverted umbrella shape and which has an upper rod portion 102 extending into cavity extension 96 and against a top 103 of the cavity extension 96 and a lower rod portion 104 which extends into the second bore 84 and has a bottom 105 which forms a stop for limiting upwardly movement of the lower ball 98. The upper end of the second bore 84 is countersunk, i.e. has a larger-in-diameter cavity portion 106 forming a shoulder 108 into which cavity portion 106 is received an annular formation 110 of the valve member 100 located in between the rod portions 102 and 104. This annular formation 110 has at the upper end thereof a frusto-conical skirt or umbrella 112 which extends upwardly and radially outwardly from the annular formation 110 so as to engage a cylindrical wall surface 113 of the cavity portion 106. A lower edge 114 of the annular formation 110 seats on the shoulder 108 and has spaces 116 (FIG. 4) between ribs 118 (FIGS. 4–7) of the formation 110 permitting communication between the second bore 84 and the cavity portion 106.

The valve assembly together with trigger handle 16, piston 34, cavity 44 and spring 50, form a pump 120 which also includes a port 122 in a side wall of cylindrical boss 66 which communicates the second bore 84 with an opening 124 in body 12 between cavity 44 and cavity 68.

In operation of the pump 120, when trigger handle 16 is squeezed, piston 34 is pushed into cavity 44 to push fluid in cavity 44 through opening 124 and port 122 and against skirt 112, moving skirt 112 inwardly so that the expressed fluid flows from cavity portion 106 through cavity extension 96 and horizontal passageway 97 to nozzle assembly 14 at the same time container 26 is vented.

Then, when trigger handle 16 is released, spring 50 pushes piston 34 out of cavity 44 creating a vacuum in second bore 84 which draws liquid up through dip tube 88, third bore 86, past ball 98 and through second bore 84, port 122, opening 124 and into cavity 44 ready to be dispensed, i.e., sprayed, on the next squeezing of trigger handle 16.

To minimize, if not altogether prevent, malfunction of pump 120, a guide post 130 extends horizontally from the rear end of cavity 44 for receiving and guiding spring 50 at one end thereof. Then, piston 34 has an annular cavity 132 extending into the inner end portion 42 thereof to form a guide pin 134 therein around which the other end of spring 50 is received. The length of post 130 or pin 134 can be varied to provide a metering function, i.e., to increase or decrease the effective stroke of piston 34 and the amount of fluid dispensed on each "trigger squeeze".

The inner end portion 42 of piston 34 has a special configuration which is generally annular in shape and of larger diameter than the body of piston 34. The annular inner end portion 42 has a concave, arcuate in cross-section, annular groove extending between a forward flared annular ridge and a rearward flared annular ridge. Each of the ridges has a diameter slightly greater than the diameter of the cavity 44 to provide a frictional/sealing fit of the annular inner end formation 42 of piston 34 in cavity 44. To facilitate flexing of the annular ridges, the inner end portion 42 has a frusto-conical opening extending outwardly from the annular cavity 132 toward the rearward annular ridge. Then an axially facing annular groove is provided at the forward end of the annular inner end formation 42 radially inwardly of the forward annular ridge. Also, to facilitate insertion of the inner end formation or portion 42, cavity 44 has a chamfer 135 where it opens on the front side 46 of lower body portion 28.

Engagement of pin 134 with post 130 or engagement of the rear edge of inner end portion 42 with the rear end of cavity 44 limits the inward stroke of piston 34 on the squeezing of trigger handle 16.

On the other hand, engagement of an upper shoulder 136 of trigger handle 16 with an underside 138 of a nose bushing 140 which forms part of nozzle assembly 14 and which is situated beneath the upper body portion 30, limits the outer stroke of piston 34.

Turning now to nozzle assembly 14, it will be appreciated that the nozzle assembly 14 has an off position, a stream and a spray mist position and includes the nose bushing 140 which has a cylindrical section 141 that is received partly in a part annular, horizontally extending, slot 142 in the outlet end 15 of the upper body portion 30 and about a cylindrical body section 143 which is coaxial with passageway 97. The nose bushing 140 further includes a forward formation 144 including an annular cavity 145 within an annular nozzle mounting portion 146 and about a center portion 147 which is eccentric to cylindrical section 141. The annular cavity 145 communicates with the passageway 96 and the center portion has an axial cavity 148. Ports 149 in the wall of center portion 147 communicate annular cavity 145 with axial cavity 148.

Then, nozzle assembly 14 further includes a stream nozzle 150 that has an off position, a stream position and a spray mist position which has an outer cap formation 152 which is snap-fittingly received over the annular nozzle mounting formation 146 and an inner cap formation 154 which is received over the outer end of center portion 147. A stream forming orifice 156 coaxial with and extending through cap formations 152 and 154 communicates with axial cavity 148.

Figure 3:
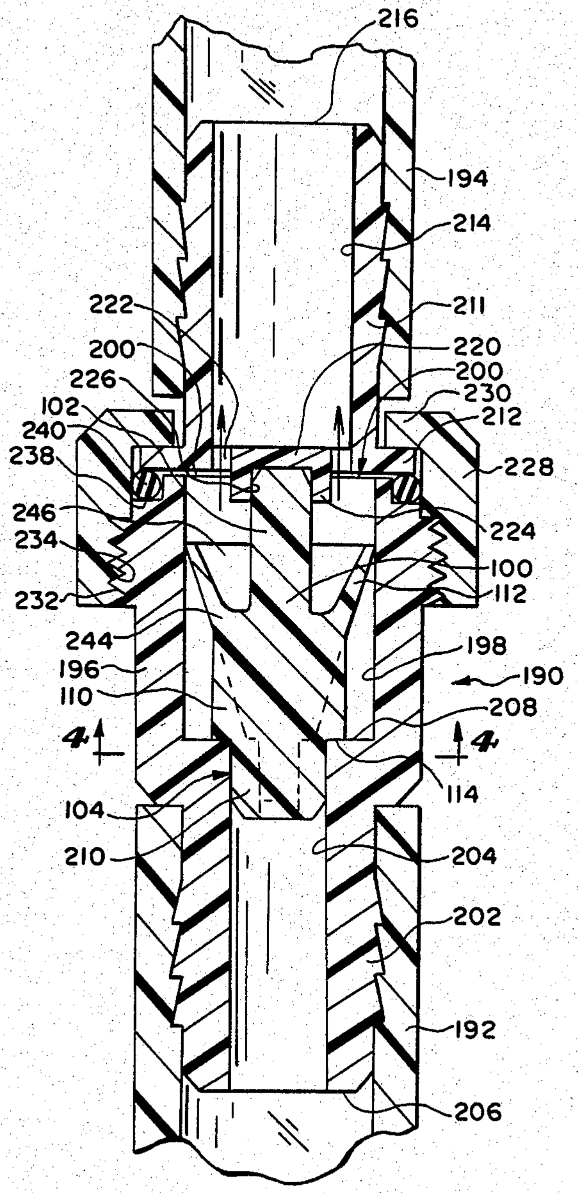
FIG. 3 is a longitudinal sectional view of a check valve assembly in a fluid line and shows the use of the conical skirt/umbrella valve member in the check valve assembly.
Figure 6:
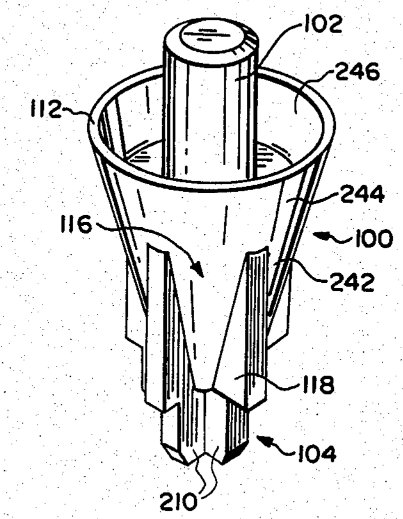
FIG. 6 is a perspective view of the conical skirt/umbrella valve member viewing same from a position above the valve member.
Figure 7:
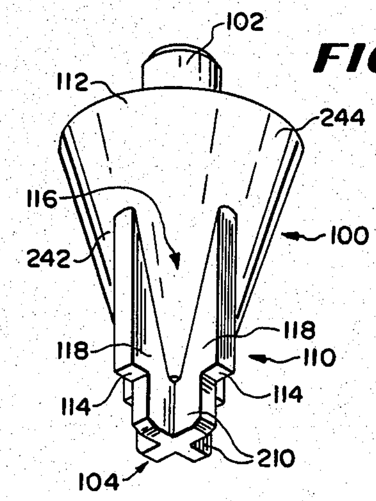
FIG. 7 is a perspective view of the conical skirt/umbrella valve member viewing same from a position below the valve member.

Referring now to FIG. 3 there is illustrated therein a check valve assembly 190 which is mounted in line between two conduits or tubings 192 and 194 and which includes the valve member 100 having upper: rod portion 102; lower rod portion 104 (forming part of the annular formation 110); frusto-conical skirt 112 and annular formation 110 comprising ribs 118 having spaces 116 therebetween. The valve member 100 shown in FIG. 3 and used in valve assembly 190 is identical to the valve member 100 shown in FIG. 2 except for the fact the rod portion 102 is shorter.

The assembly 190 further includes a generally cylindrical housing 196 having a cylindrical cavity 198 therein opening onto a downstream end 200 of the housing 196. The housing 196 also has formed thereon a smaller-in-diameter, ribbed connector/fitting 202 which has a smaller-in-diameter (than the diameter of cavity 198) throughbore 204 therein that opens onto an upstream end 206 of the housing 196. The throughbore 204 opens into the bottom of the cavity 198 forming thereby an annular shoulder 208 at the bottom of the cavity 198. As shown, a lower, and less wide, portions 210 of the ribs 118 are received in the bore 204 and define the lower rod portion 104. The lower seating edges 114 of the formation 110 rest on the annular shoulder 208.

The valve assembly 190 not only includes the valve member 100 within the housing 196 but also an upper, ribbed, connector/fitting 211 which is received within the upper tubing or conduit 194. The connector/fitting 211 has a lower flange 212 and is adapted to be positioned over upper downstream end 200 of the housing 196. The connector/fitting 211 has a bore 214 therein which opens onto a downstream end 216 of the connector/fitting 211 and extends through the connector/fitting 211 to a bottom wall 220 which is generally coplanar with the flange 212. The bottom wall 220 has at least four openings 222 therethrough (two of which are shown in FIG. 3) and has a depending annular ring formation 224 which defines a cavity 226 into which the upper rod portion 102 is received.

The wall 220 prevents upward movement of the valve member 100 and serves to hold the valve member 100 within the cavity 198 when the connector/fitting 211 is fixed in position on the upper downstream end 200 of the housing 196. This is accomplished by means of a threaded collar 228 which has an upper inwardly extending annular flange 230 which is received over the flange 212 of the connector/fitting 211. The collar 228 has a thread formation 232 on the inner surface thereof which is adapted to mate with and threadingly engage a mating thread formation 234 on the upper outer surface of the housing 196.

For sealing purposes, the upper end 200 of the housing 196 has an outer annular shoulder 238 in which is received a resilient O-ring 240. The flange 212 engages the O-ring 240 and compresses same against the annular shoulder 238 to establish a fluid tight seal when the collar 228 is screwed or threaded onto the housing 196 to secure the upper, ribbed, connector/fitting 211 adjacent the upper end 200 of the housing 196 as shown.

Referring now to FIGS. 4–7, the annular formation 110 includes the four ribs 118 which extend downwardly from a conical outer surface 242 of the vavle member 100, the upper portion of which is defined by the frusto-conical skirt portion 112. In this respect and as shown if FIGS. 3 and 5, the lower portion of the valve member 100 includes a solid frusto-conical body 244 with an annular frusto-conical cavity 246 being defined within the skirt 112 and the upper rod portion 102 above the body 246.

The lower less wide portions 210 of the ribs 118 are integral with the ribs 118 and, as noted above, define the lower rod portion 104.

From the foregoing description it will be apparent that the check valve assembly 190 of the present invention can be used in any fluid flow system where a check valve is required and that the valve member 100 thereof can be utilized in a general purpose check valve assembly, e.g., valve assembly 190, or in a special purpose check valve assembly, such as in the valve assembly 90 in the trigger sprayer 10 shown in FIG. 2.

The umbrella shaped valve member 100 has a number of advantages. For example, it provides a positive, one-way shutoff valve which, becuase of the internal resistance of the seal provided between the skirt 112 and bore 84 or cavity 198, lens itself to controlling flow of viscous materials as well as other liquids.

Additionally, the umbrella valve member 100 works as a hydraulic valve which is only activated by pressure exerted on same by fluid or viscous material.

Further, the conical shape of the skirt 112 allows the fluid to collapse the seal between the skirt 112 and the wall of the bore 87 or cavity 198 inwardly of the axis of the valve member 100 such that there is no back pressure or loss of functionality of the valve member 100. Furthermore, the valve member 100 operates solely as a valve mechanism with metering of the output fluid being achieved by another mechanism.

Still further, the valve member 100 has an unlimited capacity depending on the size of the valve assembly 90 or 190 and the size of the valve member 100, and in particular, the thickness of the skirt portion 112 and the material of which the skirt portion 112 is made.

Other advantages of the umbrella valve member 100 are as follows:

1. The umbrella valve member 100 can be used in a high pressure system or a low pressure system.

2. In the trigger sprayer 10 the pump 120 and valve assembly 90 can be primed with a minimum amount of strokes and once primed it will not lose the fluid; on squeezing of the trigger, the valve assembly 90 is immediately reprimed.

3. External forces such as squeezing the bottle or container 26 will not activate the valve assembly 90.

4. There is no post-activation that will allow fluid to be expelled through the orifice 156 in the nozzle 14 when the trigger 16 is released and the valve assembly 90 will not allow post throttling of fluid through the bore 84.

5. The simplicity of design of the valve member 100 facilitates plastic mold design and plastic cavitation design of the valve member 100.

6. The flexibility of the outer sealing surface 242 of the frusto-conical skirt 112 allows for some imperfection in the outer sealing surface 242 since the flexibility of the skirt 112 will force the surface 242 against the wall of the bore 84 or cavity 198.

Preferably, the valve member 100 is made of low-density polyethylene or equivalent material, the material composition being based upon the compatibility of the particular material with fluids to be dispensed.

Although the trigger sprayer 10 shown in FIG. 2 shows a lower valve including a ball 98 and an upper valve comprising the valve member 100, both the upper and lower valves can be defined by umbrella valve member 100.

From the foregoing description it will be apparent that the valve assembly 90 or 190 of the present invention, and in particular the valve member 100 thereof, has a number of advantages, some of which have been described above and others of which are inherent in the invention.

Also it will be apparent that modifications can be made to the valve assembly 90 or 190 of the present invention without departing from the teachings of the invention. Accordingly, the scope of the invention is only to be limited as necessitated by the accompanying claims.

I claim:

1. A check valve for controlling the flow of fluid through a cylindrical passageway having a cylindrical wall surface, said check valve comprising: a housing with a stepped chamber therein, a larger diameter portion of said chamber forming said cylindrical passageway and an annular shoulder being defined at the junction between the larger chamber portion and a smaller-in-cross-section portion; an elongate umbrella valve member having a frusto-conical shaped skirt extending radially outwardly and axially of said valve member, said skirt being positioned to extend in the downstream direction of the flow of fluid through the passageway and in frictional, sealing engagement with the cylindrical wall surface of the passageway but yet being flexible enough to deflect inwardly under fluid pressure to allow fluid to flow past said skirt; and said valve member further including a formation defined by at least two ribs extending radially outwardly and generally opposite of each other, and axially of said valve member and integral therewith, which formation is received in said passageway for seating on said annular shoulder and which has an upstream portion that extends into the smaller-in-cross-section chamber portion.

2. The check valve of claim 1 wherein said valve member has a frusto-conical body portion and a rod portion extending from said body portion in the same axial direction as said skirt, said skirt surrounding and flaring outwardly from said rod portion and being integral with said body

3. The check valve of claim 2 including stops means at the downstream end of said passageway in said housing for engaging said rod portion.

4. The check valve of claim 3 wherein said stop means is defined by a perforated wall which engages and prevents movement of said valve member in a downstream direction and which permits flow of fluid through said wall in the area thereof not engaged by said rod portion.

5. The check valve of claim 1 wherein said ribs are situated diametrically opposite each other.

6. The check valve of claim 5 wherein said formation comprises two additional ribs which are situated diametrically opposite each other in a plane normal to the plane of said two first ribs.

7. The check valve of claim 1 wherein each of said ribs has a stepped outer edge with an outer portion extending generally in the same direction as the elongate axis of said valve member, an inner portion which is received in said smaller-in-cross-section chamber portion, and a shoulder which is situated between said outer and inner portions and which rests on said annular shoulder.

8. The check valve of claim 7 wherein said valve member, in the area between said ribs, has a conical surface which ends at the plane of said rib shoulders, the cross sections of said conical valve member at the locaion of said rib shoulders being less than the diameter of said smaller-in-cross-section chamber portion such that flow-through passages are defined between said ribs and between said chamber portion.

9. The check valve of claim 1 wherein said valve member is made of a flexible elastomeric material.

10. The check valve of claim 9 wherein said elastomeric material is polyethylene.

* * * * *

UNITED STATES PATENT AND TRADEMARK OFFICE
CERTIFICATE OF CORRECTION

PATENT NO. : 4,527,594

DATED : July 9, 1985

INVENTOR(S) : Richard P. Garneau

It is certified that error appears in the above-identified patent and that said Letters Patent is hereby corrected as shown below:

Column 6, line 35, "vavle" should be --valve--.

line 56, "becuase" should be --because--.

line 58, "lens" should be --lends--.

Column 8, line 23, Claim 2, after "body" insert --portion of said valve member.--.

line 51, Claim 8, "aion" should be --ation--.

Signed and Sealed this

*Twenty-ninth* Day of *April 1986*

[SEAL]

*Attest:*

DONALD J. QUIGG

*Attesting Officer* *Commissioner of Patents and Trademarks*